(12) United States Patent
Gandham et al.

(10) Patent No.: US 7,881,274 B2
(45) Date of Patent: Feb. 1, 2011

(54) TRI-CORE ARCHITECTURE FOR REDUCING MAC LAYER PROCESSING LATENCY IN BASE STATIONS

(75) Inventors: Shashidhar R. Gandham, Sunrise, FL (US); Amit Shukla, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 110 days.

(21) Appl. No.: 12/456,725

(22) Filed: Jun. 22, 2009

(65) Prior Publication Data

US 2009/0323657 A1 Dec. 31, 2009

Related U.S. Application Data

(60) Provisional application No. 61/133,494, filed on Jun. 30, 2008.

(51) Int. Cl.
*H04Q 7/24* (2006.01)
*H04B 7/212* (2006.01)
*H04L 12/413* (2006.01)

(52) U.S. Cl. .................. 370/338; 370/442; 370/445

(58) Field of Classification Search .............. 370/254, 370/255, 338, 401, 442, 445, 458, 468
See application file for complete search history.

(56) References Cited

U.S. PATENT DOCUMENTS

| 6,487,183 | B1 * | 11/2002 | Lo et al. | 370/326 |
|---|---|---|---|---|
| 7,623,542 | B2 * | 11/2009 | Yonge et al. | 370/445 |
| 2003/0174664 | A1 * | 9/2003 | Benveniste | 370/317 |
| 2005/0135284 | A1 * | 6/2005 | Nanda et al. | 370/294 |
| 2005/0195858 | A1 | 9/2005 | Nishibayashi et al. | |
| 2007/0280184 | A1 | 12/2007 | Shin et al. | |
| 2008/0069040 | A1 | 3/2008 | An | |
| 2010/0150074 | A1 * | 6/2010 | Yamada et al. | 370/328 |

* cited by examiner

*Primary Examiner*—Hong Cho
(74) *Attorney, Agent, or Firm*—Dennis L. Cook, Esq.

(57) ABSTRACT

A tri-core architecture for reducing MAC layer processing latency at the base stations is described. The new architecture minimizes the processing delay by introducing a pipelined approach. The fundamental concept involves splitting the Medium Access Control (MAC) layer functionality into three distinct tasks, with each processor performing a given task. All tasks will be thus performed concurrently, avoiding much of the overhead encountered while processing received packets and preparing packets to be transmitted.

2 Claims, 2 Drawing Sheets

TRI-CORE ARCHITECTURE FOR REDUCING MAC LAYER PROCESSING LATENCY IN BASE STATIONS

CROSS-REFERENCE TO RELATED APPLICATION

The present application claims the benefit of previously filed co-pending Provisional Patent Application, Ser. No. 61/133,494.

FIELD OF THE INVENTION

This invention addresses the need to transport high bit-rate data and voice to multiple users over wired and wireless means. Specifically, this disclosure describes a tri-core architecture that minimizes the latency associated with MAC layer processing in base stations based on pipelining of the tasks wherein each core is performing a specified set of tasks associated with a MAC layer. The proposed tri-core architecture enables support for a greater number of concurrent users than single-core architectures.

BACKGROUND OF THE INVENTION

The invention disclosed in this application uses any integer cycle or impulse type modulation and more particularly is designed to work with a method of modulation named Tri-State Integer Cycle Modulation (TICM) which has been previously disclosed in U.S. Pat. No. 7,003,047 issued Feb. 21, 2006 and is now known by its commercial designation, xMax. This new wireless physical layer technology developed by xG Technology Inc., referred to as xMAX, enables extremely low power omni-directional transmissions to be received in a wide area Using xMAX, significant bandwidth can be made available for supporting various wireless applications. Voice Over IP (VoIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations. Although the Heterogeneous MAC protocol for multiple base stations is disclosed in the preferred embodiment as being used in these types of integer cycle and pulse modulation systems it can be implemented on any broad band wireless technologies like WiMax, WiBro, WiFi, 3GPP and HSDPA, or any other type of wired or wireless voice or data systems.

A heterogeneous MAC protocol proposed to support VOIP traffic in xMAX wireless networks has been discussed in previously filed patent applications U.S. Ser. Nos. 12/069, 057; 12/070,815; 12/380,698; 12/384,546; 61/125,696; 61/132,160; 61/132,131; and, 61/132,893 which are incorporated by reference into this disclosure. In the heterogeneous MAC protocol described in these applications, guaranteed timeslots are assigned to forward VOIP packets, temporary timeslots are assigned to forward data packets and contention based access is used to exchange control messages. This application describes a tri-core architecture that minimizes the latency associated with MAC layer processing in base stations based on pipelining of the tasks wherein each core is performing a specified set of tasks associated with MAC layer.

BRIEF SUMMARY OF THE INVENTION

The invention disclosed in this application was developed for and is described in the preferred embodiment as being used in any integer cycle or impulse type modulation and more particularly a method of modulation known by its commercial designation, xMax, but can be implemented on any broad band wireless technologies like WiMax, WiBro, WiFi, 3GPP and HSDPA, or any other type of wired or wireless voice or data systems. This disclosure describes a tri-core architecture that minimizes the latency associated with MAC layer processing in base stations based on pipelining of the tasks wherein each core is performing a specified set of tasks associated with MAC layer for use in wireless VoIP systems with multiple base stations.

DESCRIPTION OF THE DRAWINGS

For a fuller understanding of the nature and objects of the invention, reference should be made to the accompanying drawings, in which.

DETAILED DESCRIPTION OF THE INVENTION

Although the tri-core architecture for reducing MAC layer processing latency at the base stations disclosed herein can be used in all wireless and wired networks the preferred embodiment is described below in the context of the new wireless physical layer technology developed by xG Technology Inc., referred to as xMAX, which enables extremely low power omni-directional transmissions to be received in a wide area. Using xMAX, significant bandwidth can be made available for supporting various wireless applications. Voice Over IP (VOIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations.

In the preferred embodiment VOIP-based cellular network xMAX handsets (or mobile nodes) are equipped with the complete VOIP stack. The xMAX base station is connected to the Internet through an Ethernet port. The mobile nodes communicate with the xMAX base station to reach a VOIP gateway. Deployment scenarios and detailed discussions of the MAC protocol have been disclosed in the patent applications described above which are hereby incorporated in this application.

In the heterogeneous MAC protocol discussed above, guaranteed timeslots are assigned to forward VOIP packets, temporary timeslots are assigned to forward data packets and contention based access is used to exchange control messages. Various types of timeslots make a super-frame that repeats itself periodically. The number of concurrent handsets that can be supported in a cell, referred to as cell-capacity, is determined by the number of timeslots in a super-frame. The number of timeslots in each super-frame depends on the duration of each timeslot. A timeslot should be long enough for all the MAC layer computations to be performed for a packet and transmit the packet over the air interface. Typical MAC layer computations include (i) appending the MAC header and CRC, (ii) compression of headers for RTP packets, (iii) retransmissions, (iv) fragmentation/re-assembly and (v) moving a packet between SRAM and I/O buffers of various peripherals like the Ethernet and air interface.

If the base station architecture involved one processor (or one core) to accomplish all the tasks then the duration of each timeslot could be unnecessarily long. Some of the tasks related to the MAC layer can be accomplished well before the beginning of a timeslot in which a packet has to be transmitted. RTP header compression is one such task. Note that the base station is always either in transmit or receive mode. As a result, carrying out MAC layer computations before the start of a timeslot with a single core is not possible.

Figure 1:
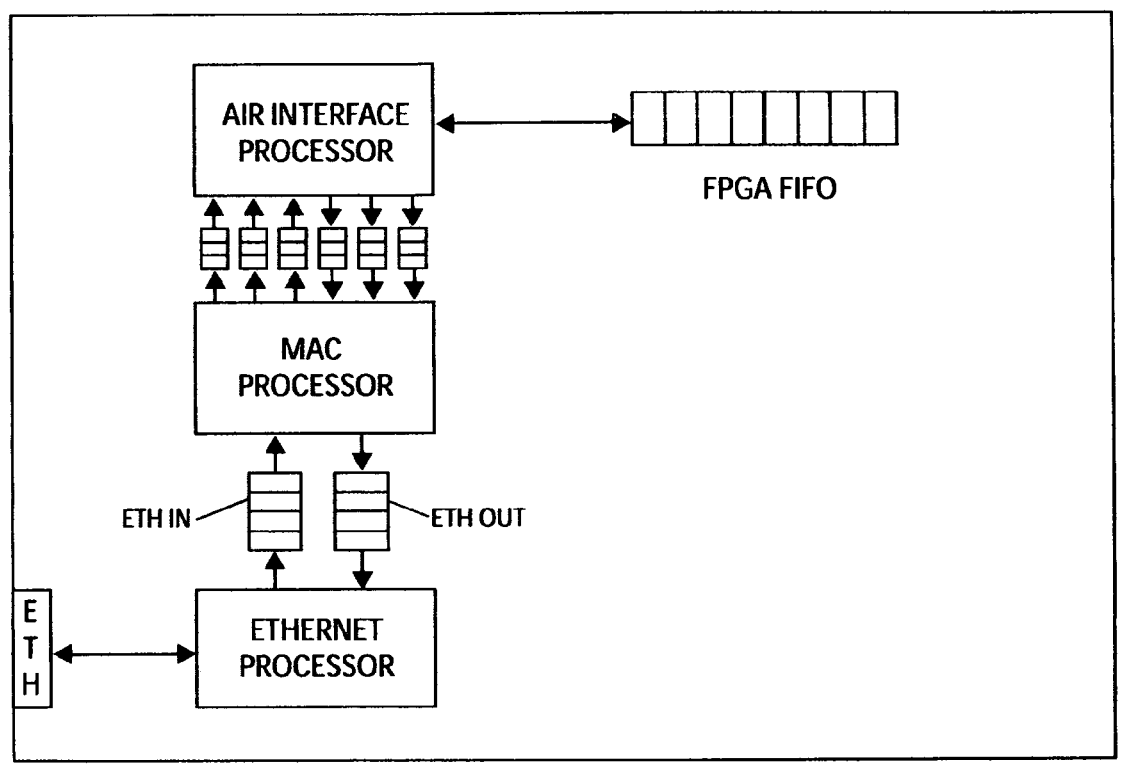
FIG. 1 is a diagram showing a basic tri-core based architecture.

In this invention disclosure we describe an architecture wherein three processors, or cores, are used in the base station. FIG. 1 depicts a basic tri-core based architecture. Each processor performs a unique task and uses internal on-chip memory to communicate with the other processor. A brief description of the functionality of each core is given below:

Ethernet Processor: it is the interface to the back-haul network. Its responsibilities include reading incoming packets and writing outgoing packets to the Ethernet. It has access to two shared memory buffers, namely ETH_IN buffer and ETH_OUT buffer. All incoming packets are inserted into the ETH_IN buffer where as all outgoing packets are read from the ETH_OUT buffer and transmitted onto the Ethernet. The Ethernet processor has exclusive write access to the ETH_IN buffer, however it can only read from the ETH_OUT buffer.

MAC Processor: it performs the bulk of the processing. All the major MAC operations are controlled by this processor. It is responsible for fragmentation/reassembly, header compression, handset registrations, timeslot allocation and various other packet-processing tasks. It follows a basic timing structure wherein each super-frame is split into two portions. In the initial part of each super-frame uplink packets are processed. In the latter part of the super-frame downlink packets are processed. The MAC processor reads the packets from the ETH_IN buffer and processes the packet to be transmitted over the air. In addition, it processes packets received over the air and inserts them into the ETH_OUT buffer.

Air Interface Processor: it is the interface to the wireless link and is responsible for transmitting and receiving the packet using the physical layer. It follows a strict time-slot based timing structure, where each user is assigned a pair of timeslots. Each timeslot has dedicated buffers associated with it where incoming and outgoing packets are stored. These buffers will be created using dual-port on-chip memory and will be shared between the AIP and MAC processors. The MAC processor, after processing a packet, will insert it into the buffer of the corresponding time-slot. The Air Interface Processor, at the beginning of the downlink time-slot, will read from the corresponding buffer and forward the packet to the physical layer to be transmitted over the air. During the uplink timeslot the processor will attempt to receive incoming packets. If a packet is received then it will insert the packet in the shared buffer. This packet will be read and processed by the MAC processor before being passed on to the Ethernet Processor.

Figure 2:
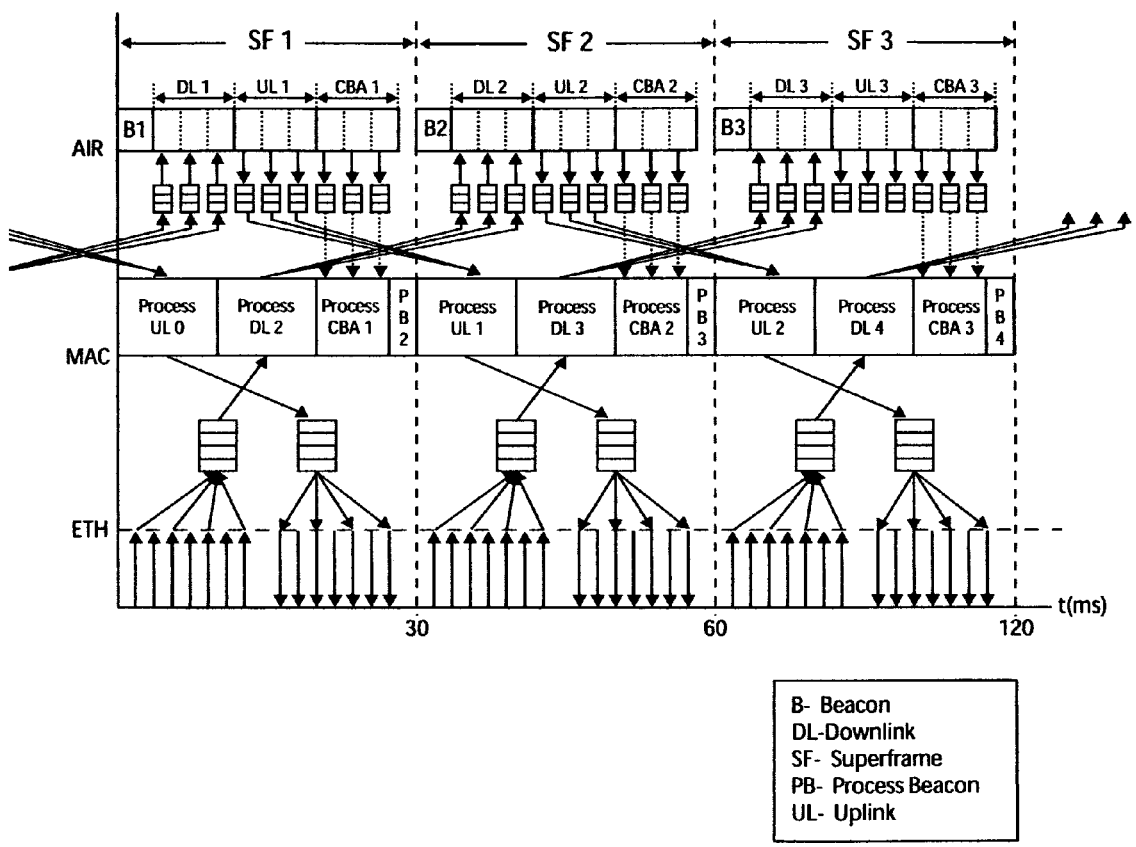
FIG. 2 is a diagram showing the timing structure of a basic tri-core based architecture.

Timing Architecture: FIG. 2 shows the detailed timing structure of the tri-core architecture. The Ethernet processor runs asynchronously; alternating between receiving packets from the Ethernet and transmitting packets to the Ethernet. The MAC Processor functions in sync with the super-frame structure. However, the activities of the MAC processor are not based on timeslot boundaries. Instead its activities vary during the uplink and downlink periods. During the current Uplink duration, the MAC will process the packets received during the Uplink period of Air Interface Processor in the previous super-frame. These packets will then be inserted into the ETH_OUT Buffer, from where the ETH Processor will transmit them over the back-haul. During the Downlink duration, the MAC will process the packets received over the Ethernet (in Tx Dual Port Buffer). The processed packet will be inserted into buffer corresponding to the timeslot in which it is to be sent and will be transmitted in the next super-frame.

By employing multiple processor cores, the requirement of processing the packet within the timeslot is avoided. A separate processor now handles the processing, thus the time-slot period has to be long enough to receive or transmit a packet. This allows a reduction in the time-slot period, thereby increasing system capacity.

In this application we described a tri-core architecture that minimizes the latency associated with MAC layer processing. The idea is based on pipelining of the tasks wherein each core is performing a specified set of tasks associated with MAC layer. The proposed tri-core architecture enables support for a greater number of concurrent users than single-core architectures.

Since certain changes may be made in the above described tri-core architecture that minimizes the latency associated with MAC layer processing by the base station using a MAC protocol for use in VoIP systems without departing from the scope of the invention herein involved, it is intended that all matter contained in the description thereof, or shown in the accompanying figures, shall be interpreted as illustrative and not in a limiting sense.

What is claimed is:

1. A processing system that minimizes the latency associated with medium access control protocol layer processing for a medium access control protocol that combines contention-free and contention-based medium access control protocols into a heterogeneous medium access control protocol used for forwarding Internet Protocol packets containing voice traffic, signaling traffic, and application data traffic between a base station and mobile nodes in a voice over internet protocol system on a wireless network comprising:

A base station in electrical communication with the Internet;

one or more mobile nodes in wireless electrical communication with said base station;

said base station and said one or more mobile nodes each having a medium access control protocol;

said medium access control protocol having super-frames of equal intervals of time;

each of said super-frames made up of an initial time for contention-free timeslot based access voice traffic and a remainder time for contention-based access signaling traffic and application data traffic;

said base station capable of dynamically determining a time duration of said super-frames and said initial time for contention-free timeslot based access based on a packetization interval determined by the duration of the voice traffic in said Internet Protocol packets; and, said base station having three concurrently running processors comprised of an Ethernet processor which acts as the interface to the Internet, a medium access control processor that processes tasks associated with Internet Protocol packets, and an air interface processor which acts as the interface to wireless links.

2. The processing system of claim 1 wherein said Ethernet processor runs asynchronously, alternating between receiving packets from the Internet and transmitting packets to the Internet.

* * * * *